US010812814B2

(12) United States Patent
Jung et al.

(10) Patent No.: US 10,812,814 B2
(45) Date of Patent: Oct. 20, 2020

(54) METHOD FOR INTRA-CODING OF A DIGITAL IMAGE AND CORRESPONDING DECODING METHOD

(71) Applicant: B<>COM, Cesson Sevigne (FR)

(72) Inventors: Joel Jung, Le Mesnil Saint Denis (FR); Felix Henry, Saint Gregoire (FR); Charlene Mouton, Saint Gregoire (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 16/092,962

(22) PCT Filed: Jun. 19, 2017

(86) PCT No.: PCT/FR2017/051608
§ 371 (c)(1),
(2) Date: Oct. 11, 2018

(87) PCT Pub. No.: WO2018/002474
PCT Pub. Date: Jan. 4, 2018

(65) Prior Publication Data
US 2019/0174138 A1 Jun. 6, 2019

(30) Foreign Application Priority Data
Jun. 29, 2016 (FR) ..................................... 16 56137

(51) Int. Cl.
*H04N 19/196* (2014.01)
*H04N 19/11* (2014.01)
(Continued)

(52) U.S. Cl.
CPC ......... *H04N 19/197* (2014.11); *H04N 19/103* (2014.11); *H04N 19/11* (2014.11);
(Continued)

(58) Field of Classification Search
None
See application file for complete search history.

(56) References Cited

U.S. PATENT DOCUMENTS

2019/0166370 A1* 5/2019 Xiu ...................... H04N 19/176

FOREIGN PATENT DOCUMENTS

| EP | 2063644 A2 | 5/2009 |
| EP | 2391130 A2 | 11/2011 |
| WO | 2012038938 A1 | 3/2012 |

OTHER PUBLICATIONS

Wang et al., "Novel Adaptive Algorithm for Intra Prediction With Compromised Modes Skipping and Signaling Processes in HEVC," IEEE Transactions on Circuits and Systems for Video Technology, vol. 23, No. 10, Oct. 2013, pp. 1686-1694. (Year: 2013).*

(Continued)

*Primary Examiner* — Christopher Braniff
(74) *Attorney, Agent, or Firm* — David D. Brush; Westman, Champlin & Koehler, P.A.

(57) ABSTRACT

A method for decoding a coded data stream representative of at least one image, the image being divided into blocks, a set of at least two prediction modes being available for predicting a current block. The method includes: obtaining at least two categories of prediction modes from the set; eliminating at least one category in accordance with at least one first predetermined elimination criterion; updating the categories not eliminated by deleting prediction modes that are common with the at least one eliminated category; and decoding, from the data stream, an information identifying for the current block a prediction mode among the modes of the updated categories.

18 Claims, 9 Drawing Sheets

(51) Int. Cl.
- H04N 19/103 (2014.01)
- H04N 19/176 (2014.01)
- H04N 19/593 (2014.01)
- H04N 19/14 (2014.01)

(52) U.S. Cl.
CPC ........... *H04N 19/14* (2014.11); *H04N 19/176* (2014.11); *H04N 19/593* (2014.11)

(56) References Cited

OTHER PUBLICATIONS

International Search Report dated Oct. 4, 2017 for corresponding International Application No. PCT/FR2017/051608, filed Jun. 19, 2017.
English translation of the International Written Opinion dated Nov. 7, 2018 for corresponding International Application No. PCT/FR2017/051608, filed Jun. 19, 2017.
Jaballah Sami et al., "Clustering-based fast intra prediction mode algorithm for HEVC", 2015 23rd European Signal Processing Conference (EUSIPCO), EURASIP, Aug. 31, 2015 (Aug. 31, 2015), pp. 1850-1854, XP032836694.
Ding Wenpeng et al., "A Fast Intra-Mode Decision Scheme for HEVC", 2014 5th International Conference on Digital Home, IEEE, Nov. 28, 2014 (Nov. 28, 2014), pp. 70-73, XP032715347.
Longfei Gao et al., "Fast Intra Mode Decision Algorithm Based on Refinement in HEVC", 2015 IEEE International Symposium on Circuits and Systems (ISCAS), May 1, 2015 (May 1, 2015), pp. 517-520, XP055354967.
Zhao Wenjun et al., "Hardware-Oriented Fast Mode Decision Algorithm for Intra Prediction in HEVC", 2013 Picture Coding Symposium (PCS), IEEE, Dec. 8, 2013 (Dec. 8, 2013), pp. 109-112, XP032566980.
French Search Report and Written Opinion dated Mar. 16, 2017 for corresponding French Application No. 1656137, filed Jun. 29, 2016.
Wang, Li-Li, Novel Adaptive Algorithm for Intra Prediction With Compromised Modes Skipping and Signaling Processes in HEVC, IEE Transactions on Circuits and Systems for Video Technology, vol. 23M No. 10. Oct. 10, 2013, pp. 1686-1694.
Mitchell, Tom M., Machine Learning, Mar. 1, 1997, 0070428077, pp. 1-414, McGraw-Hill Science/Engineering/Math.
Jain, Anil K., Fundamentals of Digital Processing, Prentice Hall Information and Systems Sciences Series, pp. 1-565, 1989, ISBN 0-13-336165-9, Prentice Hall, Englewood Cliffs, NJ.
Marpe, Detlev, Context-Based Adaptive Binary Arithmetic Coding in the H.264/AVC Video Compression Standard, IEEE Transactions on Circuits and Systems for Video Technology, vol. X, No. Y., Month 2003, pp. 1-18.

* cited by examiner

METHOD FOR INTRA-CODING OF A DIGITAL IMAGE AND CORRESPONDING DECODING METHOD

1. CROSS-REFERENCE TO RELATED APPLICATIONS

This Application is a Section 371 National Stage Application of International Application No. PCT/FR2017/051608, filed Jun. 19, 2017, the content of which is incorporated herein by reference in its entirety, and published as WO 2018/002474 on Jan. 4, 2018, not in English.

2. FIELD OF THE INVENTION

The field of the invention is that of the coding and decoding of images or sequences of images, and in particular of video streams.

More specifically, the invention relates to the compression of images or sequences of images using a block representation of the images.

The invention may especially apply to the image or video coding implemented in the current coders (JPEG, MPEG, H.264, HEVC, etc. and their amendments) or to future ones, and to the corresponding decoding process.

3. DESCRIPTION OF THE RELATED ART

Images and digital image sequences occupy a lot of space in terms of memory, which requires, when transmitting these images, to compress them in order to avoid congestion problems on the network used for this transmission. Indeed, the usable throughput on this network is generally limited.

Many techniques of video data compression are already known. Among these, the HEVC compression standard (High Efficiency Video Coding, Coding Tools and Specification, Matthias Wien, Signals and Communication Technology, 2015) proposes to implement a prediction of pixels of a current image with respect to other pixels belonging to the same image (intra prediction) or to a previous or next image (inter prediction).

More specifically, intra prediction exploits spatial redundancies within an image. To do this, the images are divided into blocks of pixels. The blocks of pixels are then predicted using already reconstructed information, corresponding to the previously coded/decoded blocks in the current image according to the order of the blocks in the image.

Moreover, conventionally, the coding of a current block is carried out using a prediction of the current block, called the predicted block, and a prediction residue or "residual block" corresponding to a difference between the current block and the predicted block. The residual block obtained is then transformed, for example using a DCT transform (discrete cosine transform). The coefficients of the transformed residual block are then quantised, afterwards coded by entropy coding and transmitted to the decoder, which can reconstruct the current block by adding this residual block to the predicted block.

The decoding is done image by image, and for each image, block by block. For each block, the corresponding elements of the stream are read. Inverse quantisation and inverse transformation of the coefficients of the residual block are performed. Then, the prediction of the block is calculated to obtain the predicted block and the current block is reconstructed by adding the prediction (the predicted block) to the decoded residual block.

In the HEVC standard, it is possible to perform an intra prediction of a current block according to 35 intra prediction modes. To code the intra prediction mode selected to predict a current block, the HEVC standard defines two lists of prediction modes:

- a first list called MPM list (for "Most Probable Mode") comprising the 3 most probable intra prediction modes for the current block, such an MPM list is defined from the prediction modes previously selected during the coding of the neighbouring blocks of the current block.
- a second list, so-called non-MPM list, comprising the remaining 32 intra prediction modes, i.e. the intra prediction modes not included in the MPM list.

An index is transmitted to the decoder to indicate which MPM or non-MPM list is used to predict the current block. When the current block is coded by an intra prediction mode of the MPM list, the index of the prediction mode selected in the MPM list is transmitted to the decoder by entropy coding. When the current block is coded by an intra prediction mode of the non-MPM list, the index of the intra prediction mode selected in the non-MPM list is coded by a fixed length code of 5 bits.

The non-MPM list comprises a large number of intra prediction modes, so that the cost of coding an index of a prediction mode of this list is high.

The document "Novel Adaptive Algorithm for Intra Prediction with Compromised Modes Skipping and Signalling Processes in HEVC", L-L. Wang, W C Siu, IEEE, 2013, describes a coding method that makes it possible to reduce the number of intra prediction modes used to predict a current block in order, on the one hand, to reduce the cost of signalling an intra prediction mode and, on the other hand, to reduce the complexity of selecting a prediction mode. Such a method creates three categories based on the 35 intra prediction modes available, a first one comprising a mode, a second comprising 19 modes and a third comprising the 35 modes. It chooses for each current block the category adapted according to the value of the variance of the reference pixels of the current block. The reference pixels of the current block correspond to the pixels of the line above the current block and the column to the right of the current block. A current block is then predicted by one of the prediction modes of the list. In the selected category, the best prediction mode is chosen in accordance with a rate-distortion criterion. It is marked with information identifying the category and then the mode in that category.

Such a method makes it possible to reduce the computation time of the prediction of a current block, since in some cases not all intra prediction modes are tested. It can also allow in some cases to reduce the flow. Indeed, if the chosen category is one that has only one predictor, there is nothing to report.

4. DISADVANTAGES OF PRIOR ART

When the second or third category is chosen, the bit rate is not reduced, since the signalling is provided on the basis of the set of prediction modes initially available.

5. SUMMARY

An aspect of the present invention relates to a method for decoding a coded data stream representative of at least one image, said image being divided into blocks, a set at least two prediction modes being available for predicting a block, said current block, said method comprising the following steps:

Providing at least two categories of prediction modes from the set;

Suppressing at least one category based on at least one first predetermined elimination criterion;

Updating the categories not eliminated by deleting prediction modes which are common with said at least one eliminated category;

Decoding, from the data stream of information identifying for the current block, a prediction mode among the modes of the updated categories.

With the invention, the decoder eliminates the categories of prediction modes that are not adapted to the current block and removes from the remaining categories the prediction modes that are common with the eliminated categories. It uses its knowledge of categories not eliminated and updated to interpret in the data stream the coded data signalling the prediction mode chosen by the coder for the current block.

Unlike the prior art, which signals the prediction mode selected on the basis of the initial categories, the prediction mode signalling selected for the current block is specific and adapted to the updated categories of prediction modes. Thus, the cost of the prediction mode signalling is optimised.

The invention also relates to a method for coding an image in the form of a stream of coded data, said image being divided into blocks, a set of at least two prediction modes being available for predicting a block, said current block, said method comprising the following steps:

Providing at least two categories of prediction modes from the set;

Suppressing at least one category in accordance with at least one first predetermined elimination criterion;

Updating the categories not eliminated by deleting prediction modes that are common with said at least one eliminated category;

Selecting a prediction mode in one of the updated categories; and

Coding based on updated categories of a information identifying the selected prediction mode and inserting the coded information into the coded data stream.

The various embodiments or features mentioned below may be added independently or in combination with each other, to the features of the decoding method and/or coding method defined above.

According to one aspect of the invention, the obtaining step comprises reading identification information of said categories in a memory.

The categories of prediction modes are predetermined. One advantage is the simplicity of implementation and the limited need for computing resources.

According to another aspect of the invention, the obtaining step comprises an analysis of at least one feature of a content of blocks already processed and a creation of the categories from at least one criterion of grouping of the modes of prediction and according to said at least one analysed feature.

Categories are created dynamically, based on the content already processed. One advantage is that the categories obtained are adapted to the content of the image.

According to another aspect of the invention, the method comprises, for a category obtained, a step of determining a prediction mode representing this category and the step of eliminating the category comprises an elimination of the prediction mode representing, the elimination of the category being triggered by the elimination of the prediction mode representing it.

One advantage is that the entire category is eliminated in one operation.

According to yet another aspect of the invention, for a category obtained, the step of eliminating the category comprises the successive elimination of its prediction modes, the comparison of the number of prediction modes eliminated in the category to a predetermined threshold, the elimination of the category being triggered when the number of eliminated modes is greater than the threshold.

One advantage is that the modes of the category are tested individually before making an elimination decision.

According to another aspect of the invention, the method comprises, for a category obtained, said category being associated with a criterion for grouping prediction modes, a step of analysing the content of the neighbouring blocks already processed intended to provide a feature of the content and the elimination step eliminates the category when the feature and the grouping criterion are incompatible with each other.

One advantage is that the entire category is eliminated if it can be established that it is not adapted to the content to be processed.

The invention also relates to a decoding device adapted to implement the decoding method according to any one of the particular embodiments defined above. This decoding device may of course comprise the various features relating to the decoding method according to the invention. Thus, the features and advantages of this decoding device are the same as those of the decoding method, and are not detailed further.

According to a particular embodiment of the invention, such a decoding device is included in a terminal.

The invention also relates to a coding device adapted to implement the coding method according to any one of the particular embodiments defined above. This coding device may of course include the various features relating to the coding method according to the invention. Thus, the features and advantages of this coding device are the same as those of the coding method, and are not detailed further.

According to a particular embodiment of the invention, such a coding device is included in a terminal or a server. Such a terminal or server equipment may comprise a coding device and a decoding device according to the invention.

The decoding method, respectively the coding method according to the invention can be implemented in various ways, particularly in hard-wired form or in software form.

According to a particular embodiment of the invention, the decoding method, respectively the coding method, is implemented by a computer program comprising instructions for implementing the steps of a method as described above, when this program is executed by a processor.

These programs can use any programming language. They can be downloaded from a communication network and/or recorded on a computer-readable medium.

The invention finally relates to recording media, which are readable by a processor, whether or not integrated into the device for coding a digital image and into the device for decoding a digital image according to the invention, which might be removable, respectively storing a computer program implementing a coding method and a computer program implementing a decoding method, as described above.

6. LIST OF FIGURES

Other features and advantages of the invention will appear more clearly on reading the following description of an embodiment of the invention, given as a simple illustrative and non-limiting example, and the appended drawings among which:

FIG. 1 presents schematically the steps of obtaining, eliminating and updating the categories of prediction modes according to a first embodiment of the invention;

FIG. 2 presents schematically the steps of obtaining, eliminating and updating the categories of prediction modes according to a first embodiment of the invention;

FIG. 3 schematically presents categories of prediction modes comprising common modes;

Figure 6:
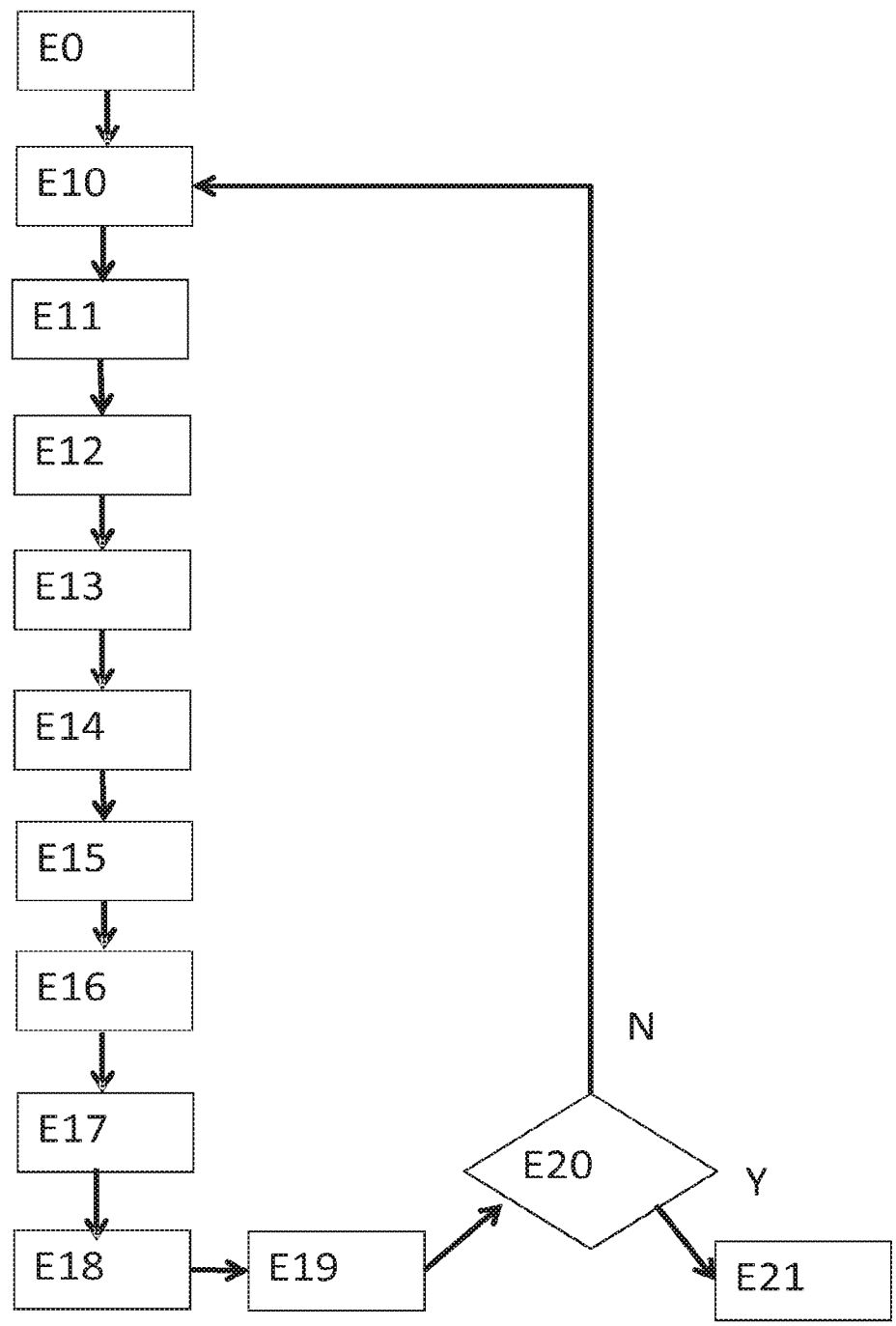
Figure 7:
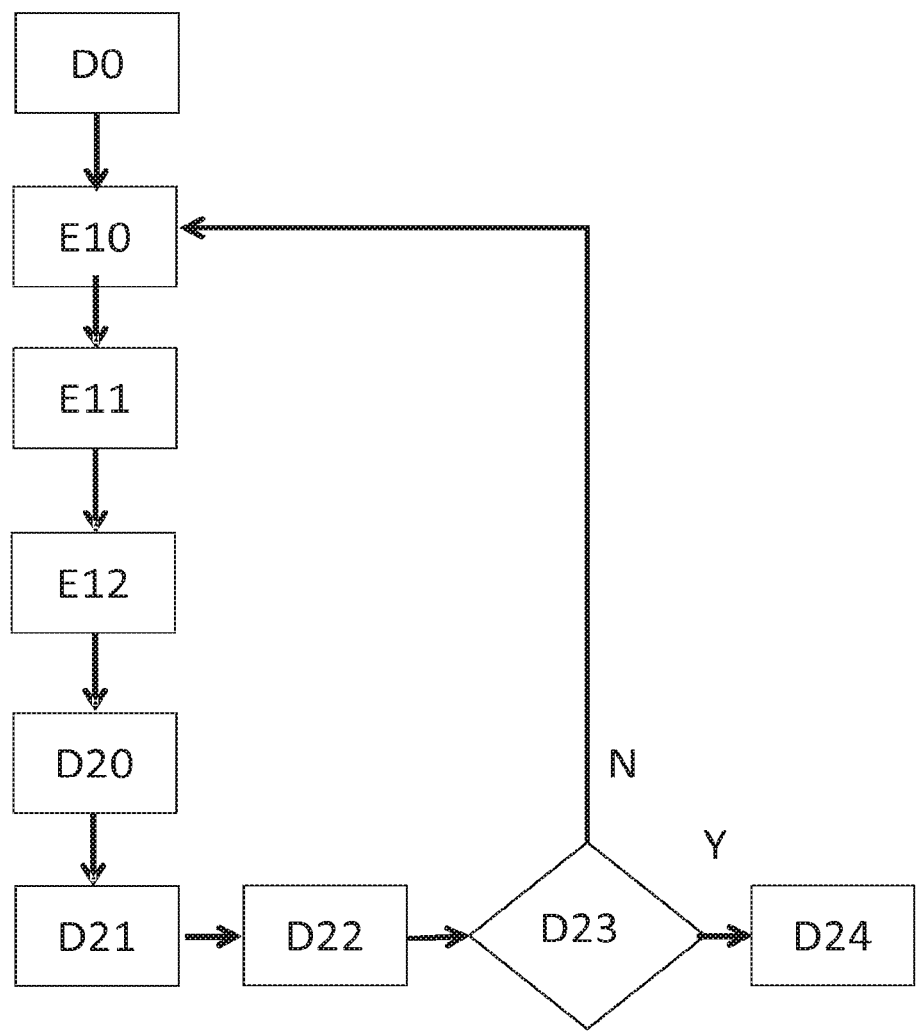
Figure 8:
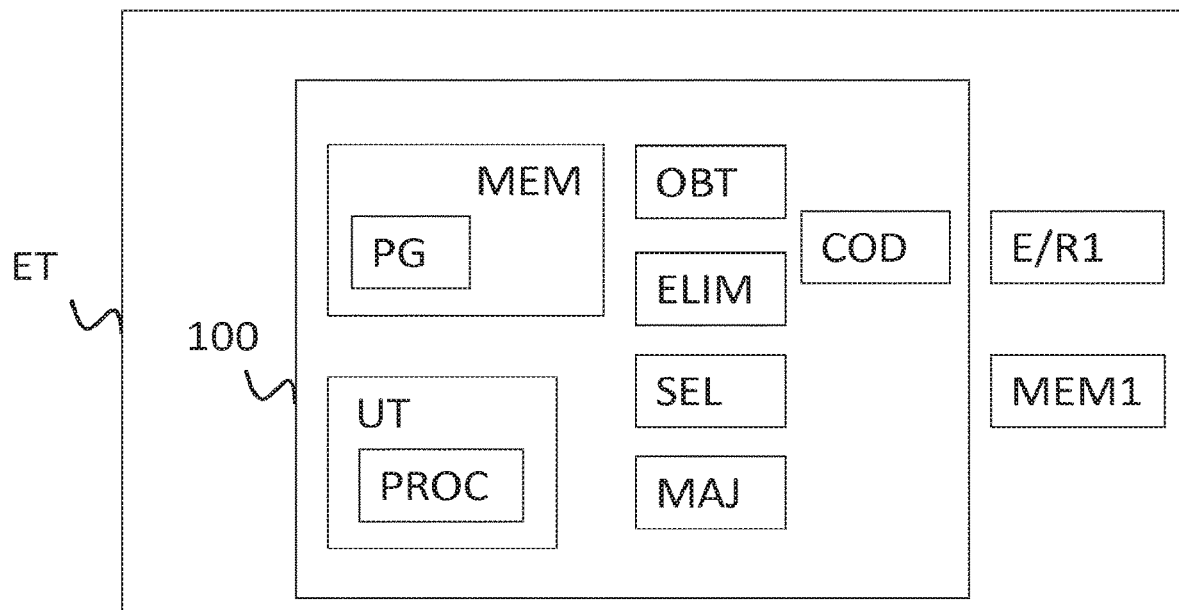
Figure 9:
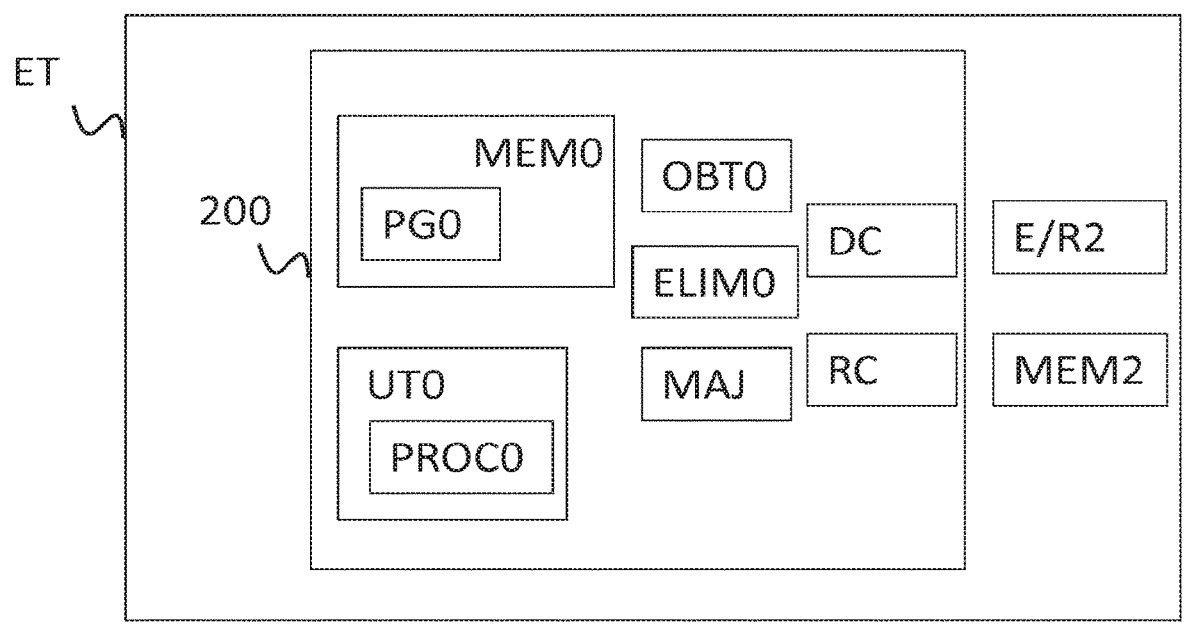

FIG. 6 schematically shows the steps of a method for coding an image according to the invention;

FIG. 7 schematically shows the steps of a method for decoding an image according to the invention;

FIG. 8 schematically shows the hardware structure of a coding device according to the invention; and FIG. 9 schematically shows the hardware structure of a decoding device according to the invention.

7. DESCRIPTION OF A PARTICULAR EMBODIMENT OF THE INVENTION 7.1 General Principle The aim of the invention is to improve the cost of signalling a prediction mode used to predict a block of pixels of an image to be coded.

Current compression standards offer a large number of prediction modes for coding a block in order to provide a prediction as close as possible to the pixels of the block to be coded. Thus, the quantised prediction residue is low, or even zero, which makes it possible to reduce the cost of coding the prediction residue. However, the cost of signalling a prediction mode increases with the number of possible prediction modes.

However, it seems possible to group the prediction modes into categories based on one or more features of the content of the image they have in common and to predict that the prediction modes of the same category are not suitable for predicting the current block.

The general principle of the invention is based on the establishment of categories of prediction modes in the initial set of the prediction modes in competition for the coding or the decoding of a current block of a digital image and on the elimination of entire categories. Modes of a category which have not been eliminated and which are common to eliminated categories are deleted. This principle applies to both the coder and the decoder.

In this way, the number of prediction modes for coding a block is reduced and since the decoder is adapted to build identically the same categories, whereby signalling can be done on the basis of the reduced number of modes available for the prediction of the current block.

The invention is here described in the context of an application to intra prediction modes defined in the HEVC standard. The invention is readily applicable to other compression standards and other modes of prediction.

Figure 4A:
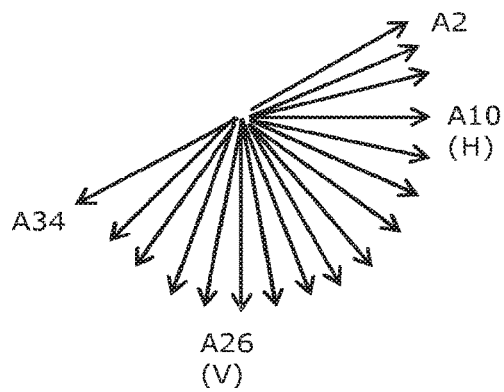
FIGS. 4A to 4G illustrate examples of categories of prediction modes implemented by the invention.

It should be reminded that the HEVC standard defines 35 intra prediction modes:

A PLANAR mode (mode 0), this mode comprising linearly interpolating the pixels of the predictor block (or predicted block) from the reference pixels; the reference pixels being constructed from neighbouring blocks previously reconstructed, a mode DC (mode 1), this mode consists in assigning to the pixels of the predictor block the same value corresponding to an average of the reference pixels, 33 angular modes A2-A34 illustrated in FIG. 4A. Such modes form a predictor block by the extension of the reference pixels of the current block in one of the 33 associated directions.

Figure 1:
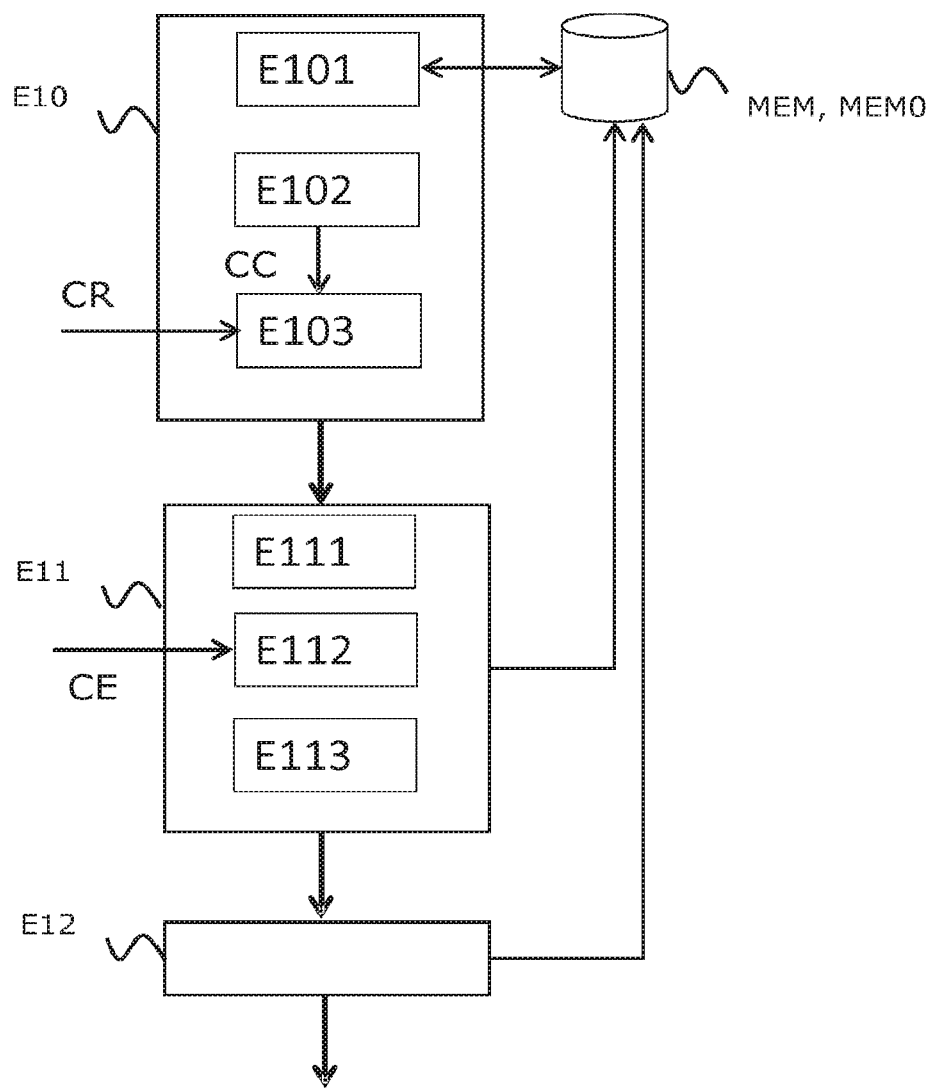

In connection with FIG. 1, the steps of obtaining categories E10, of eliminating categories E11 and of updating categories E12 according to the invention, implemented in the coding method according to the invention are described in connection with FIG. 6 and in the decoding method according to the invention with reference to FIG. 7.

7.2 Providing at Least Two Categories of Prediction Modes from the Initial Set

Figure 3:
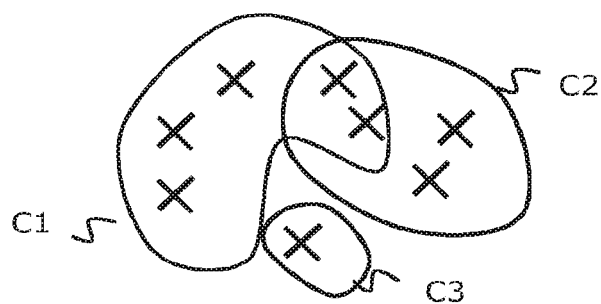

In step E10, the coder or decoder obtains categories of prediction modes formed from the initial set of available prediction modes. As shown in FIG. 3, the categories may have common prediction modes.

These categories were formed using one or more CR grouping criteria of the prediction modes. A grouping criterion is advantageously associated with a value or a range of values of a feature of the content of a block. In other words, the prediction modes are grouped on the basis of at least one common feature, so that the prediction modes of the same category can be considered as the most suitable for predicting a block having the value of feature associated with them.

Categories may have been formed in a pre-coding and pre-decoding phase and fixed. In this case, the step E10 of obtaining categories comprises a sub-step E101 of reading information representative of these categories in a memory MEM, MEM0. For example, this information is a word that concatenates the identifiers of the categories and a category identifier is associated with a memory space storing the identifiers of the prediction modes that it contains.

In the absence of analysis feature of the content of the picture already processed, the coder, and the decoder by symmetry, obtain systematically the predetermined categories corresponding to a first categorisation profile associated for example with a coding profile.

When it has the results of an analysis of the content of the blocks already processed, which on-the-fly provides features of the content of the image, the coder and by symmetry the decoder can dynamically create categories to using grouping criteria associated with particular values or ranges of characteristic values derived from this analysis.

In this case, the step E10 comprises a sub-step E102 of obtaining features CC of the content of the blocks already processed and a sub-step E103 of creating at least one category on the basis of at least one grouping criterion CR based on at least one of these features.

It is understood that the step E10 can implement the sub-step E101 on its own, the sub-steps E102, E103 on their own, or all the sub-steps, whereas the categories formed dynamically supplement the one previously created.

Figure 4B:
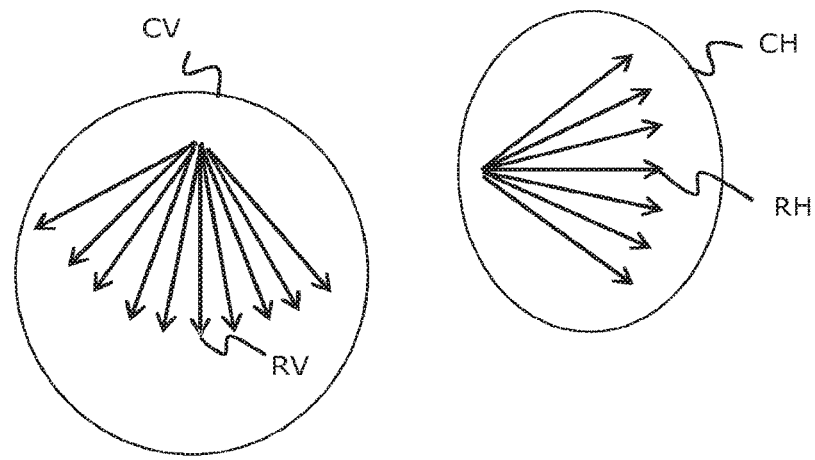
Figure 4C:
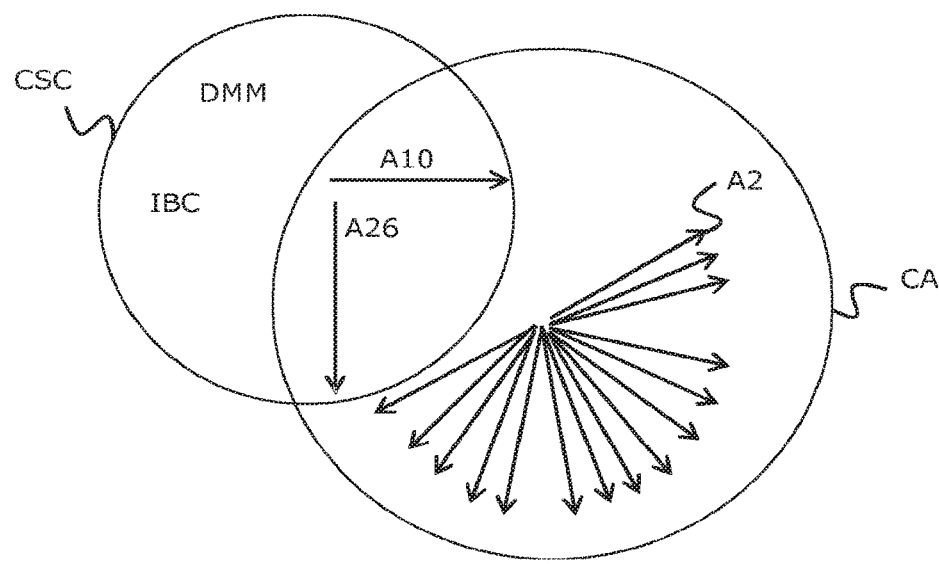

For example, the prediction modes are grouped according to a criterion associated with a physical feature of the content of the image. In connection with FIG. 4B, the physical feature considered is the orientation of the prediction mode and the prediction modes having orientations close to each other are grouped into a first category CV, called vertical, comprising vertical angle mode A26 (V) and its neighbours and a second category CH, called horizontal, comprising the horizontal angle mode A10 (H) and its neighbours.

These categories are relevant for predicting a block of an image with sharp directions, which are rather horizontal for the category CH or rather vertical for the category CV. This is the case for example of an image representing an urban scene with high buildings.

Advantageously, for a current block, the elimination step E11 will eliminate one of the two categories on the basis of an elimination criterion based on a main orientation of the block.

Another example of a physical feature, taken into account for the creation of a category is considered in connection with FIG. 4 C. It is assumed that the coder has detected in the content the presence of sharp and contrasted contours with respect to the background, often in the horizontal or vertical directions, separated by very homogeneous zones, which corresponds to a text or logo inlay on a real scene. The content of the image being coded thus comprises a superposition of virtual elements on a real scene. It creates a first category which groups modes adapted to this type of scene known as "screen content". For example, in this category CSC, it includes DMM modes (for "Depth Modelling Mode"), IBC (for "Intra Block Copy"), the horizontal angle mode A10 (H), the vertical angular mode A26 (V). It creates a second CA category comprising all the angular modes previously mentioned, including the horizontal mode and the vertical mode.

In connection with FIG. 4 D, the coder obtained in E10 three categories from the angular prediction modes. The category CA1 comprises the modes A26 (V), and A10 (H), the category CA2 the modes A2, A6, A14, A22 and the category CA3 all others. The category CA1 allows very little finesse for the coding of a direction, the category CA2 allows a little more and the category CA3 is the most precise. It is understood that these three categories make it possible to adapt to the fineness required to represent the direction of the content of a block.

These categories were created in a previous phase and are fixed. They do not have a common mode.

A preferred application of this set of categories is to use it as a coding tool in competition with others. This set of categories will therefore be chosen when it gives the best results, for example according to a rate-distortion criterion. It may in particular be expected to work well for an image for which a given zone contain simple directions (vertical and horizontal), and another area would have much finer directions (fineness in the diagonal).

According to one embodiment of the invention, the substep E103 of category creation takes into account a grouping criterion based on a statistical analysis (E102) of the prediction modes used for neighbouring blocks already processed (causal context). Advantageously, the most frequently used modes are placed in a first category. A second category includes all modes of the initial set.

Figure 4D:
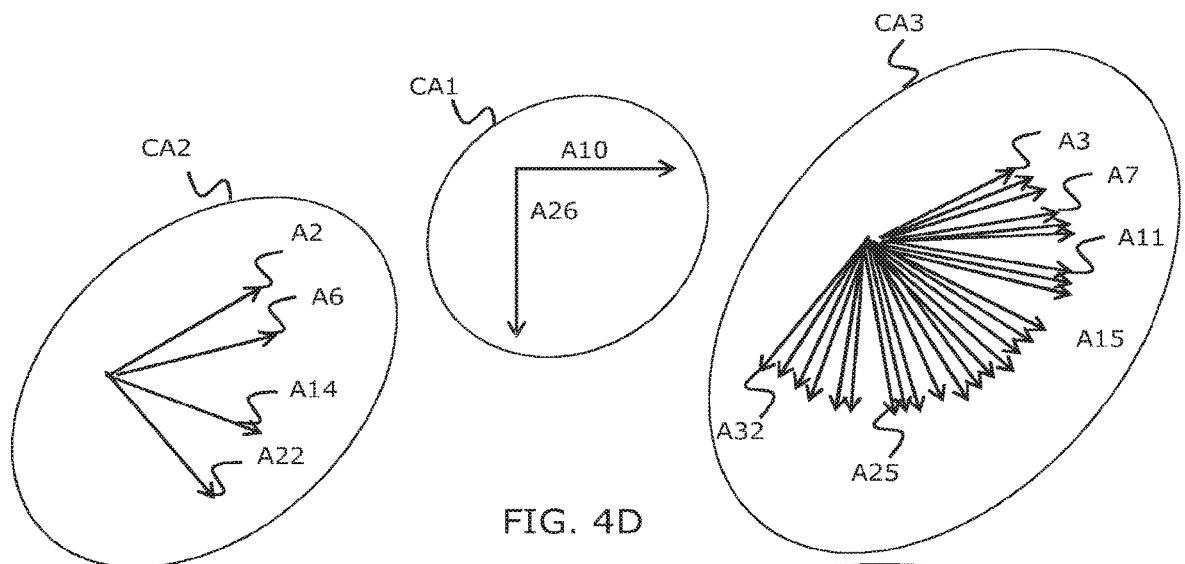
Figure 4E:
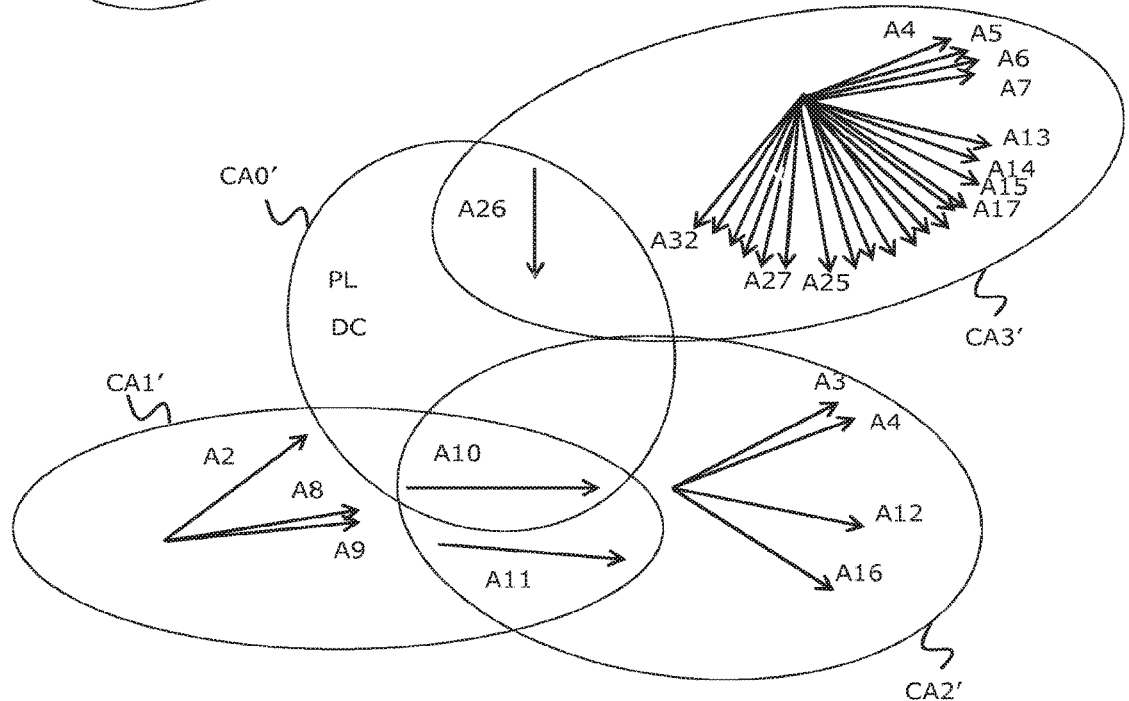

In another embodiment, illustrated on FIG. 4E, other categories are created dynamically by learning, of "Machine Learning" type on the predicted modes for blocks already processed of the current image, with respect to causal descriptors, preferably the most probable ones. The «machine learning» or ML technique, known to the man having skills in the art and for example described in the book entitled «Machine Learning», by Tom Mitchell, published by McGraw Hill in 1997.

This technique allows, following a learning phase, to emit probabilities concerning the selection of modes for the current zone. The ML is a known, complex method that we shall not detail. We can imagine therefore creating 3 other categories, depending on the degree of probability of appearance of each mode. For example, we can compare the probability of occurrence obtained at one or more thresholds and group in a first category those with a probability of occurrence greater than a first threshold, then in a second category those with a probability of occurrence greater than a second threshold lower than the first and in a third category those having a probability of occurrence greater than a third threshold lower than the second.

This provides the following categories, as shown in connection with FIG. 4E:
Category 1 C1': A2 A8 A9 A10 A11
Category 2 C2': A10 A3 A4 A11 A12 A16
Category 3 C3': all other angular modes An.

The learning is repeated regularly, with a frequency that can vary. For example, at each coding unit or each picture or group of GoP pictures (for "Group of Pictures").

Advantageously, we add to these three categories created dynamically, a first predetermined category C0', so-called by default, which comprises the prediction modes DC, A10 (H), A26 (V) and PL. This category is obtained by the coder and the decoder in E10. This makes it possible to overcome a bad prediction resulting from ML learning.

Figure 4F:
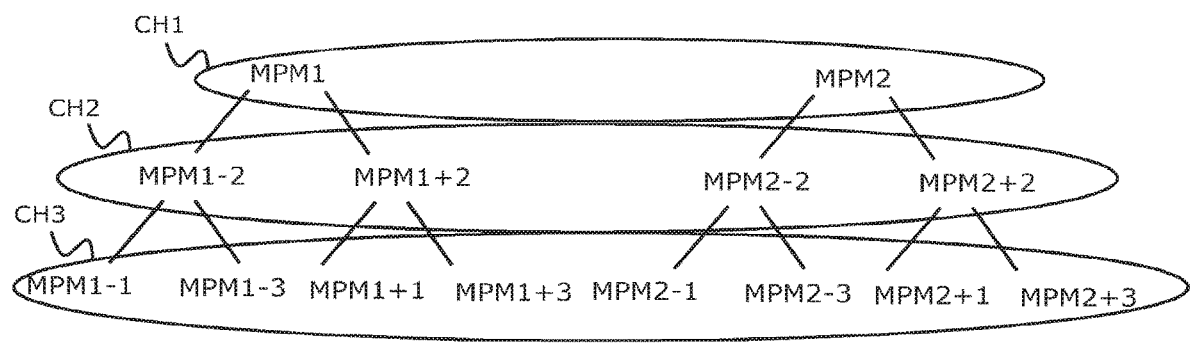
Figure 4G:
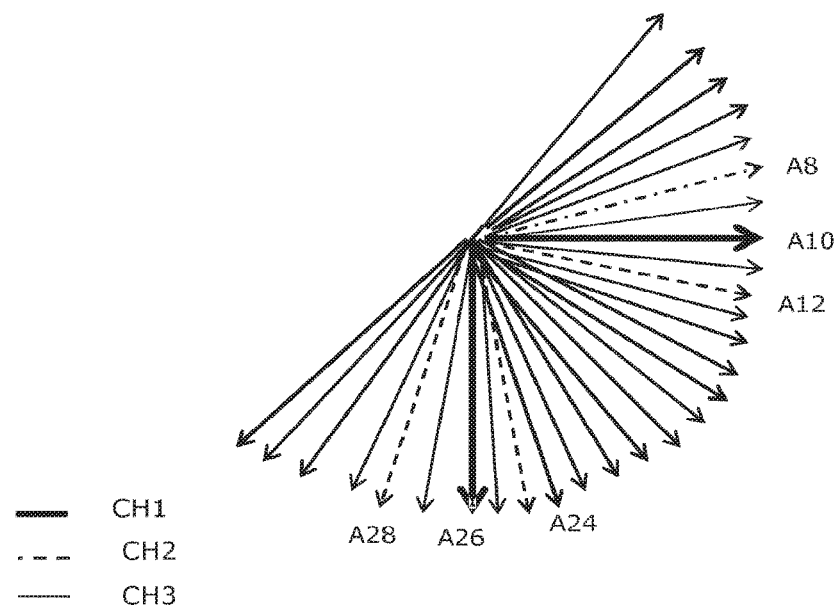

In connection with FIGS. 4F and 4G, categories can also be constructed hierarchically.

Any tree structure can be adopted (binary, ternary, irregular, etc.). This structure mimics a kind of MPM by hierarchical levels.

For example, categories are built by dichotomy. We shall define the horizontal mode A10 and the vertical mode A26 as the two most probable modes MPM1 and MPM2. They form the top-level category CH1. The second hierarchical category CH2 is derived by taking their neighbours with two jumps MPM1−2, MPM1+2, MPM2−2 and MPM2+2. We can thus create the level-3 category CH3 by taking the neighbours within a jump of the modes of the previous category: MPM 1−1, MPM1+1, MPM2−1, MPM2+1. The CH1 category comprises few prediction modes and provides low precision in terms of angular direction, while the CH3 category offers greater finesse of orientation.

7.3 Elimination of Categories

The invention covers different ways of eliminating a category.

According to one embodiment of the invention, described in connection with FIG. 1, the elimination step E11 comprises a sub-step E111 of determining a mode representing a category.

In the case of a set of angular modes, the representative may for example be the median or the average. The angular predictors are therefore ordered, and have a number that designates them. The mean hence designates the central angle of the category.

According to one variation, the prediction mode representing a category is an additional prediction mode, in the sense that it is not part of the set of initial prediction modes. It can for example be obtained this time by averaging on the predictors themselves, that is to say the value of pixels used to make the prediction, or any other function of these values. For example, in connection with FIG. 46, the vertical mode is chosen as the RV representative for the CV category and the horizontal mode as the HR representative for the CH category.

The step E11 further comprises a sub-step E112 of eliminating the representative according to an elimination criterion. The representative is tested, eliminated or not, based on at least one predictor elimination criterion.

The step E113 consists in eliminating the entire category once its representative has been eliminated.

Figure 2:
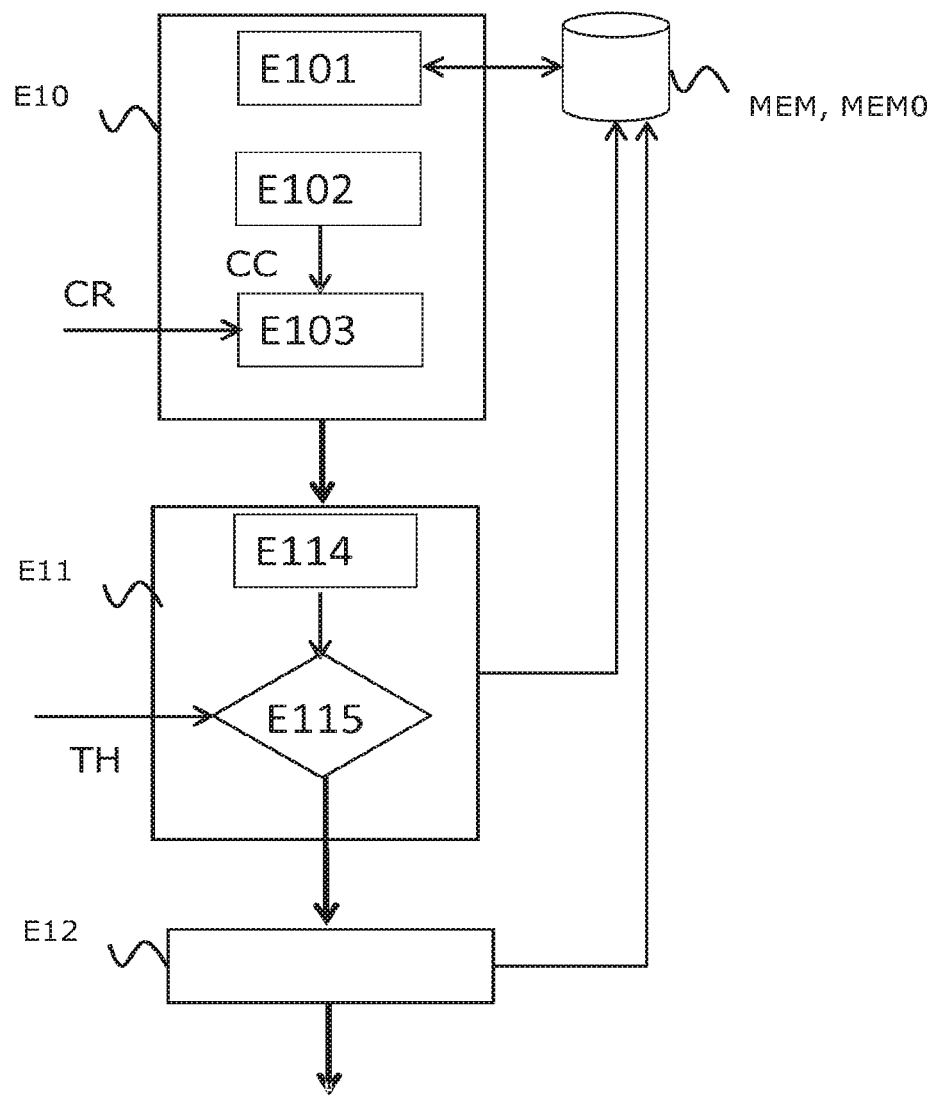

According to a variant shown in FIG. 2, it does not designate a representative, but the prediction modes of a category during a sub-step E114 are examined one by one and they are eliminated by a standard mode elimination criterion.

In the example of FIG. 4E, the categories CA0 to CA3 are heterogeneous. Therefore, no representative is therefore defined for these categories. The modes are reviewed individually to decide on their eventual elimination. The mode elimination criterion corresponds for example to the following rule: «An is discarded if the blocks in its neighbourhood have not selected An, An−1, or An+1 mode».

As a result, a number of modes in each category is assumed to be eliminated. An elimination criterion of the whole category then applies, if for example 50% of the modes of the category are supposed to be eliminated. In this case, all the modes of the category are eliminated. In particular, these same modes disappear from the other categories in which they are present. In the opposite case (less than 50%), the category is kept, and all the modes of the category are also kept (even those supposed to be eliminated).

In E115, the category is removed if the rate of the modes eliminated in the category is greater than a predetermined threshold TH.

In yet another embodiment, a feature is generally eliminated if the grouping criterion CR that was used to form is incompatible with at least one physical feature of the contents of neighbouring blocks already processed. For example, the CSC category of FIG. 4C comprises prediction modes that have a high probability of being used for blocks derived from depth images or comprising unnatural content, for example computer screen type (for "Screen content") or including overlays. However, it is not adapted to the current block belonging to an area of the image for which analysis of neighbouring blocks already processed indicates that the content comprises marked angular features as well as textured areas. The CSC category is then eliminated with all its prediction modes.

Going back to the example of FIG. 4D, we can obtain categories CA1 to CA3 based on a physical feature of orientation of the content of the current block. When the content analysis of neighbouring blocks already processed indicates that we are in a very homogeneous area, a large angular sharpness is therefore not required. We can therefore eliminate the CA3 category.

Similarly, if a gradient technique, for example of the Sobel type applied to the neighbouring blocks already processed does not show any clear horizontal or vertical direction, the category CA1 whose category of mode grouping is incompatible with the content to be processed, can be eliminated.

7.4 Updating Categories not Eliminated

We have seen that created categories can have common prediction modes.

Note that according to the invention, if a given prediction mode belongs to a first and a second category, the elimination of this mode in a first category involves its elimination of the second category E12.

In connection with FIG. 3, the elimination of category C1 implies that the second class C2 contains only two prediction modes.

7.5 Description of a First Embodiment

Figure 5:
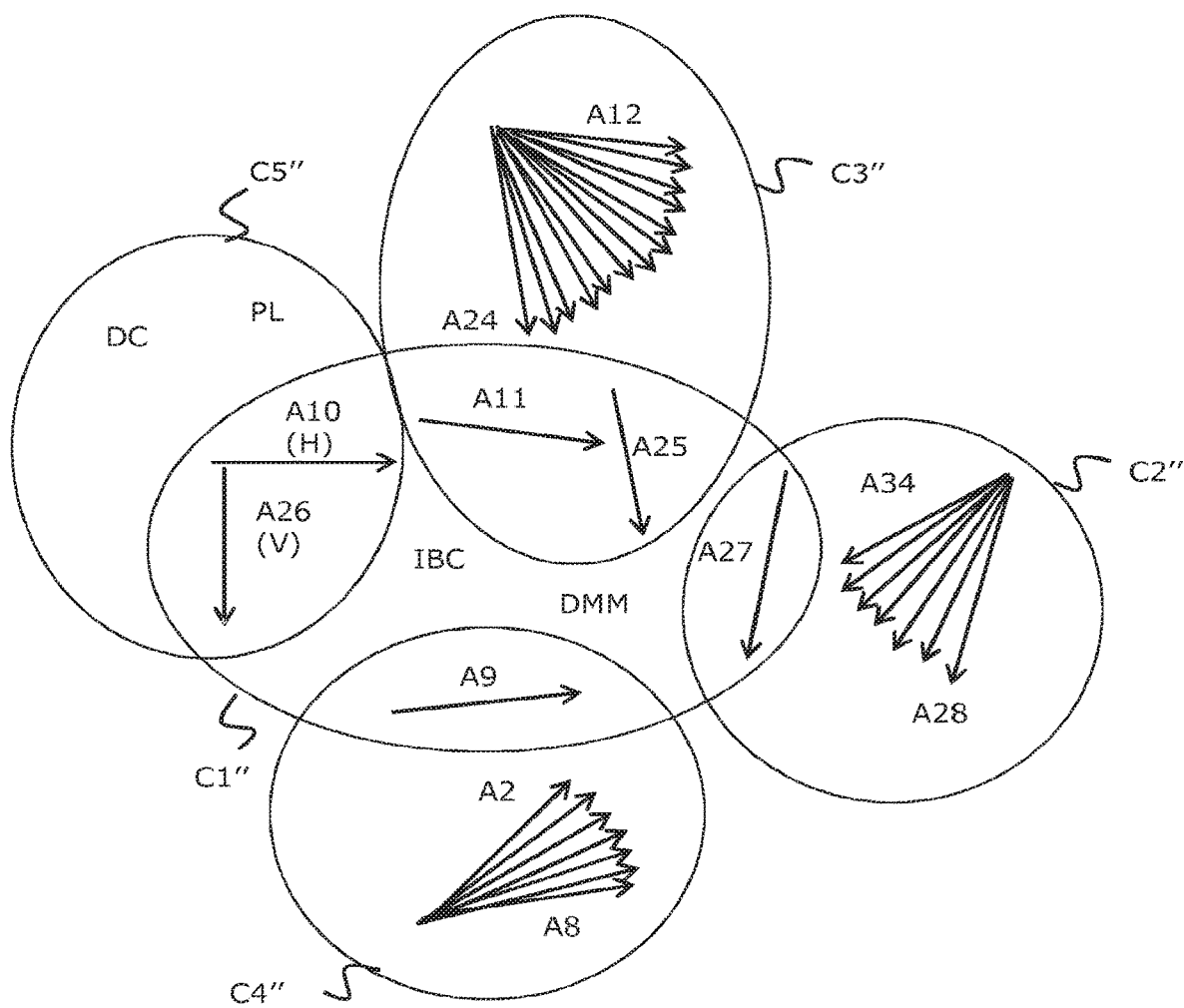
FIG. 5 illustrates an example of categories implemented in one embodiment of the invention.

In this example, illustrated in FIG. 5, the categories of prediction modes are predetermined. In other words, their creation was done in a phase prior to coding. The step E10 therefore consists in reading information representative of these categories in order to access the prediction modes, which are for example stored in a memory accessible to the coder.

We consider five categories which are constituted as follows, illustrated by FIG. 5:

the category $C1_1$ comprises the prediction modes DMM, IBC, H (A10), H−1 (A9), H+1 (A11), V (A26), V−1 (A25), V+1 (A27);

the category $C2_1$ comprises the angular prediction modes A34 . . . A27;

the category $C3_1$ comprises the angular prediction modes A25 . . . A11;

the category $C4_1$ comprises the angular prediction modes A9 . . . A2;

the category $C5_1$ comprises DC, H, V, PL.

It can be seen that certain prediction modes, such as certain angular modes, are common to several categories.

These categories, determined in advance and fixed, are known by the coder and the decoder.

For categories 2, 3 and 4, composed only of angular modes, a representative is determined in T12, which corresponds to the median angular mode of each of them. For example, the median of the group C2" is the A30.5 mode. Note that this is an additional angular mode, which is not part of the category C2".

A representative for the other categories $C1_1$ and $C5_1$, consisting of modes of prediction of heterogeneous types, is not determined.

In E11, the purpose is to eliminate one or more categories. In this embodiment, the strategy adopted consists in eliminating the angular prediction modes that are most probably useless. A so-called statistical elimination criterion is used, based on a statistical analysis of the prediction modes used by the blocks already processed in a neighbourhood that is both spatial and temporal.

For example, for categories $C2_1$, $C3_1$ and $C4_1$, the representative is tested using an elimination criterion which is expressed in the form of the following rule: "An mode is discarded if none of the blocks already processed in its neighbourhood have selected one of the modes in the group consisting of An, An−1, and An+".

This criterion leads supposedly to the elimination of the representatives of categories C2" and C3", hence to the elimination of these categories.

In E12, the non-eliminated categories are updated by removing the prediction modes they have in common with the eliminated categories. This leads us to remove the A11 (H+1), A25 (V−1), A26 (V) and A27 (V+1) angular modes from category 1.

The updated categories are as follows

Category $C1_1$: DMM, IBC, H (A10), H−1 (A9), V (A26);

Category $C4_1$: A9 . . . A2; and

Category $C5_1$: DC, H, V, PL

It is observed that there are only 15 modes left in total, compared to 38 initially.

Note that in this example only categories $C2_1$, $C3_1$, $C4_1$ have representatives, and are potentially disposable. This corresponds to a concrete case where it is desired to eliminate the maximum of unnecessary angular modes, without eliminating the other modes.

The coder then selects a prediction mode, conventionally selected from the remaining 15. Classically, this choice is made on the basis of a rate-distortion or RDO which leads to retain the mode that optimises the bit rate and coding quality.

The selected mode is indicated in the bit stream. This mode is then reported.

There are several known ways to report the selected prediction mode. According to a first option, it is indexed with respect to the 15 modes and its index is signalled. According to a second option, the category to which it belongs among to the remaining three, is signalled, then its position or index in the category.

7.6 Description of a Second Embodiment

The same predetermined categories are considered as in the first embodiment.

The category C1" groups prediction modes that are supposed to be relevant for predicting blocks comprising artificial content of the overlay or screen content type.

During the category elimination step E11, it seeks to eliminate this category 1 when it is not adapted to the content of the block to be processed.

For this category, a removal criterion based on structural analysis of the processed vicinity of the current block is used. For example, contour detection is carried out by Sobel filtering, and the directions of these contours are determined, as described in Sections 4 and 5 of AK Jain's book entitled "Fundamentals of Digital Image Processing", published by Prentice Hall in 1989. If the neighbouring blocks are found not to include content of the types covered by this category, it is discarded.

It should be noted that a similar operation could be applied to category C5", which is more suitable for homogeneous areas or light degraded areas.

7.7 Description of a Third Mode of Implementation

In this example (not shown), a first default category $C1_2$ is fixed, which contains the prediction modes DC, H, V, PL.

The step E10 comprises the dynamic creation E103 of three categories. To do this, it implements a machine learning technique (ML) in E102. The three categories are created taking into account the occurrence probability of each mode.

The categories can be, for example:

Category $C1_2$: DC, H, V, PL;
Category $C2_2$: A2, A8, A9;
Category $C3_2$: A10, A3, A4, A11, A12, A16;
Category $C4_2$: all other angular modes An.

Thus formed, the categories are heterogeneous. We do not therefore define any representatives.

In E11, each mode of each category is reviewed to decide if this mode should be eliminated. A first criterion of elimination of the mode is expressed for example in the form of the following rule: An will be discarded if the blocks in its neighbourhood have not selected An, An−1, or An+1 mode.

A second elimination criterion of the whole category then applies, if for example 50% of the modes of the category are eliminated by the first criterion. In this case, all the modes of the category are eliminated.

In E12, the eliminated modes are deleted from the remaining categories.

In particular, these same modes disappear from the other categories in which they are present.

In the opposite case (less than 50%), the category is kept, and all the modes of the category are also kept (even those supposed to be eliminated).

For example, if 50% of modes of categories 4 and 2 are eliminated, only 3 modes of category 1 and the 6 modes of category 3 remain usable on the whole. This will allow remedying a possible bad outcome prediction derived from the ML.

7.8 Description of an Exemplary Implementation of a Coding Method According to the Invention FIG. 6 presents the steps of the method of coding an image sequence $I_1, I_2, \ldots, I_N$ to be coded in the form of an STR coded data stream according to a particular embodiment of the invention. For example, such a coding method is implemented by a coding device as described with reference to FIG. 8. An image sequence $I_1, I_2, \ldots, I_N$ to be coded is provided at input of the coding method. The coding method outputs a stream of coded data STR or bit stream, representative of the image sequence provided at input.

In known manner, the coding of the image sequence $I_1, I_2, \ldots, I_N$ is done image by image according to a coding order previously established and known to the decoder. For example, images can be coded in the temporal order $I_1, I_2, \ldots, I_N$, or in another order, for example $I_1, I_3, I_2, \ldots, I_N$.

During a step E0, an image $I_k$ to be coded of the image sequence $I_1, I_2, \ldots, I_N$ is cut into blocks of maximum size. Each block of maximum size can be cut into smaller blocks. For example, a block of maximum size is 32×32 pixels in size. Such a block of maximum size can be subdivided into square or rectangular sub-blocks, for example of size 16×16, 8×8, 4×4, 16×8, 8×16, .... Then, during step E0, a block $b_c$ to be coded of an image $I_k$ is selected according to a direction of travel of the predetermined image $I_k$.

During a step E10, at least two categories of prediction modes for coding the current block $b_c$ are obtained. During the step E11, categories are eliminated according to at least one elimination criterion and in E12, the categories that have not been eliminated are updated by eliminating the modes common to the eliminated categories.

These steps have been described above according to different embodiments of the invention in connection with FIGS. 4A to 4G.

During a step E13, a prediction mode for coding the current block $b_c$ is selected from the modes of prediction of the updated categories, e.g., the prediction mode providing the best rate/distortion compromise for the block current is selected.

During a step E14, an information identifying the selected prediction mode is coded in a stream of coded data STR for the current block $b_c$. For example, such information is coded in the stream as an idx index coded by a fixed or variable length code.

According to a variation, an information representative of the category to which the selected prediction mode belongs and an information representative of a position of the prediction mode in this category are coded.

It is noted that with the invention, once the categories have been obtained, eliminated and updated symmetrically by the coder and the decoder, the coder can advantageously choose the codes in order to signal the prediction mode selected according to the number of modes of predicting the updated categories rather than based on the number of prediction modes of the initial set. Signalling is thus made less expensive.

During a step E15, a prediction residue RES is calculated from the current block $b_c$ and the predictor block P associated with the prediction mode selected in the step E13. The prediction residue RES is obtained by the difference between the current block to be coded $b_c$ and the predictor block P.

At a step E16, in known manner, the RES prediction residual is then converted, for example by a DCT and quantised. Quantised transformed residual coefficients are then obtained.

During a step E17, the quantised transformed residual coefficients are then coded by an entropy coding module, for example a CABAC coder, described in D. Marpe, H. Schwarz, T. Wiegand, «Context-based adaptive binary arithmetic coding in the H.264/AVC video compression standard» IEEE Transactions on Circuits and Systems for Video Technology (Volume: 13, Issue: 7), pages 620-636, July 2003, in the form of a coded data stream STR. During a step E18, a prediction residue RES' is reconstructed by applying inverse quantisation and inverse transformation to the quantised transformed coefficients. During a step E19, a block of pixels REC is reconstructed by adding the reconstructed prediction residue RES' to the predictor block P associated with the prediction mode selected in the step E13.

During a step E20, it is checked whether all the blocks of the image to be coded have been coded. In the negative case, the coding method resumes in step E10 by proceeding to the next block according to a predetermined path of the image to be coded.

In the case where all the blocks of the image have been processed, during a step E21, an image $I_k^{rec}$ is reconstructed from the reconstructed blocks REC of the image and saved in a list of reference images for be used later as a reference when coding subsequent images of the image sequence.

7.8 Decoding Method

FIG. 7 presents the steps of a method of decoding a stream STR of coded data representative of a sequence of images $I_1$, $I_2$, ..., $I_N$ to be decoded according to a particular embodiment of the invention.

For example, the data stream STR has been generated using the coding method described with reference to FIG. 1. The data stream STR is provided at the input of a decoding device DEC, as described with reference to FIG. 9.

The decoding method decodes the stream image-by-image. For each image to be decoded, the decoding method decodes the image block by block.

During a step E0, an image $I_k$ to be coded of the image sequence $I_1, I_2, \ldots, I_N$ is cut into blocks of maximum size. Each block of maximum size can be cut further into smaller blocks. For example, a block of maximum size is 32×32 pixels in size. Such a block of maximum size can be subdivided into square or rectangular sub-blocks, for example of size 16×16, 8×8, 4×4, 16×8, 8×16, . . . . Then, a block $b_c$ to be decoded of an image $I_k$ is selected according to a direction of travel of the predetermined image $I_k$.

For a block $b_c$ of an image to be reconstructed, during step E10, categories of prediction modes are obtained. In E11, categories are eliminated on the basis of at least one elimination criterion and the non-eliminated categories are updated in E12 by eliminating the prediction modes common to the eliminated categories. These steps E10 to E12 are performed according to a particular embodiment identical to the embodiment used during the coding of the data stream STR. They comprise a set of sub-steps have been described above according to different embodiments of the invention in connection with FIGS. 1 and 2.

In a step D20, the data of the data stream STR corresponding to the block $b_c$ are decoded by an entropy decoding module to provide, on the one hand, syntax elements relating to the coding mode (or prediction mode) of the current block $b_c$ and secondly a group of prediction residual coefficients of the current block $b_c$. The decoded syntax elements comprise in particular prediction mode information identifying for the current block $b_c$ a prediction mode among the prediction modes of the categories of prediction modes updated according to the invention. For example, if it is assumed that the updated categories are ordered, as well as the prediction modes that constitute them, such information is coded in the stream as an index idx of the ordered list formed by the remaining prediction modes. Alternatively, the prediction mode information is coded as a category identifier and an idx position index in the identified category.

In a step D 21, the prediction residual coefficients of the block $b_c$ undergo inverse quantisation and then inverse transformation to output a decoded prediction residue RES'.

During a step D22, the current block $b_c$ is reconstructed from the predictor block P associated with the decoded prediction mode and the prediction residue RES' associated with the current block $b_c$ which has been decoded from the data stream STR coded. The predictor block P has been calculated previously in step E10. A reconstructed block REC for the current block $b_c$ is thus obtained by adding the predictor block P to the decoded prediction residue RES'.

During a step D23, it is checked whether all the blocks of the image to be decoded have been decoded and reconstructed. In the negative case, the decoding method resumes in step E10 by proceeding to the next block according to a predetermined path of the image to be decoded.

In the case where all the blocks of the image have been processed, during a step D24, an image $I_k^{rec}$ is reconstructed from the reconstructed blocks REC of the image and saved in a list of reference images for be used later as a reference when coding subsequent images of the image sequence.

The coding and decoding methods described above can be integrated into standard video coders/decoders such as H.266, HEVC/H.265, AVC/H.264 or any type of proprietary video coders/decoders. The coding and decoding methods according to the invention also apply to all types of coders/decoders for still images and more generally to signals using predictive coding using several available prediction modes.

The coding and decoding methods have been previously described in the case of block spatial coding (intra coding). These methods easily apply to the case of coding a block according to other types of coding modes, inter coding for example. The list of prediction modes constructed can thus comprise different types of coding modes (intra, inter, inter-layers, etc.).

7.9 Coding Device

FIG. 8 shows the simplified structure of a coding device 100 adapted to implement the coding method according to any of the particular embodiments of the invention. The coding device 100 is adapted to code at least one image in the form of a coded data stream, said image being divided into blocks, at least two prediction modes being available for predicting a block of said image, so-called current block.

The coding device 100 is notably configured for:
  obtaining at least two categories of prediction modes from a set of prediction modes available for predicting said current block, a predictor block associated with the available prediction mode,
  eliminating at least one category based on at least one elimination criterion,
  updating the categories not eliminated, by removing the prediction modes which are common with the eliminated categories,
  selecting among the updated categories a prediction mode for coding the current block,
  coding in the data stream, information identifying for said current block said prediction mode selected among the updated categories.

According to a particular embodiment of the invention, the steps of the coding method are implemented by computer program instructions. For this purpose, the coding device 100 has the conventional architecture of a computer and notably comprises a memory MEM, a processing unit UT, equipped for example with a microprocessor PROC, and driven by the computer program PG stored in the memory MEM. The computer program PG includes instructions for implementing the steps of the coding method as described above, when the program is executed by the processor PROC.

At initialisation, the code instructions of the computer program PG are for example loaded into a RAM before being executed by the processor PROC. The processor PROC of the processing unit UT implements in particular the steps of the coding method described above, according to the instructions of the computer program PG.

According to another particular embodiment of the invention, the coding method is implemented by functional modules. For this purpose, the coding device COD furthermore comprises:

an obtaining module OBT for obtaining at least two categories of prediction modes from a set of prediction modes available for predicting said current block, a predictor block associated with the available prediction mode, an elimination module ELIM for eliminating at least one category based on at least one elimination criterion, an updating module for updating the categories not eliminated, by removing the prediction modes which are common with the eliminated categories, a selection module SEL for selecting among the updated categories a prediction mode for coding the current block, a coding module COD for coding in the data stream, information identifying for said current block said prediction mode selected among the updated categories.

The processing unit UT cooperates with the various functional modules described above and the memory MEM in order to implement the steps of the coding method.

The various functional modules described above can be in hardware and/or software form. Under a software form, such a functional module may include a processor, a memory and program code instructions for implementing the function corresponding to the module when the code instructions are executed by a processor. In a material form, such a functional module can be implemented by any type of suitable coding circuits, such as for example and without limitation microprocessors, Digital Signal Processors (DSPs), Application Specific Integrated Circuits (ASICs), Field Programmable Gate Arrays (FPGAs), a logic unit wiring.

Advantageously, such a device 100 can be integrated into a user terminal equipment ET. The device 100 is then arranged to cooperate at least with the next module of the terminal ET:

a memory MEM1 in which are stored in particular the categories of prediction modes;

a data transmission/reception E/R1 module, through which the coded data stream STR is transmitted over a telecommunications network, for example a wired network or a radio network intended for one or more decoders.

7.10 Decoding Device

FIG. 9 shows the simplified structure of a decoding device 200 adapted to implement the decoding method according to any of the particular embodiments of the invention. The decoding device 200 is adapted to decode at least one image in the form of a decoded data stream, said image being divided into blocks, at least two prediction modes being available for predicting a block of said image, so-called current block. The decoding device 200 is notably configured for:

obtaining at least two categories of prediction modes from a set of prediction modes available for predicting said current block, a predictor block associated with the available prediction mode, eliminating at least one category based on at least one elimination criterion, updating the categories not eliminated, by removing the prediction modes which are common with the eliminated categories, selecting among the updated categories a prediction mode for coding the current block, decoding, from the data stream, an information identifying for said current block, a prediction mode among the updated categories, reconstructing said current block from the predictor block associated with said identified prediction mode.

According to a particular embodiment of the invention, the decoding device 200 has the conventional architecture of a computer and notably comprises a memory MEM0, a processing unit UT0, equipped for example with a microprocessor PROC0, and driven by the computer program PG0 stored in the memory MEM0. The computer program PG0 includes instructions for implementing the steps of the decoding method as described above, when the program is executed by the processor PROC0.

At initialisation, the code instructions of the computer program PG0 are for example loaded into a memory RAM before being executed by the processor PROC0. The processor PROC0 of the processing unit UT0 implements the steps of the decoding method described above, according to the instructions of the computer program PG0.

According to another particular embodiment of the invention, the decoding method is implemented by functional modules. For this purpose, the decoding device 200 furthermore comprises:

an obtaining module OBT0 for obtaining at least two categories of prediction modes from a set of prediction modes available for predicting said current block, a predictor block associated with the available prediction mode, an elimination module ELIM0 for eliminating at least one category based on at least one elimination criterion, an updating module MAJ0 for updating the categories not eliminated, by removing the prediction modes which are common with the eliminated categories, a decoding module DC for decoding, from the data stream, an information identifying for said current block, a prediction mode among the updated categories, a reconstructing module RC for reconstructing said current block from the predictor block associated with said identified prediction mode.

The processing unit UT0 cooperates with the various functional modules described above and the memory MEM0 in order to implement the steps of the decoding method.

The various functional modules described above can be in hardware and/or software form. Under a software form, such a functional module may include a processor, a memory and program code instructions for implementing the function corresponding to the module when the code instructions are executed by a processor. In a material form, such a functional module can be implemented by any type of suitable coding circuits, such as for example and without limitation microprocessors, Digital Signal Processors (DSPs), Application Specific Integrated Circuits (ASICs), Field Programmable Gate Arrays (FPGAs), a logic unit wiring.

Advantageously, such a device 200 can be integrated into a user terminal equipment UT. The device 200 is then arranged to cooperate at least with the next module of the terminal UT:
- a memory MEM2 in which are stored in particular the categories of prediction modes;
- a data transmission/reception module E/R2, via which the bitstream STR is received from a telecommunications network, for example a wired network or a radio network from a coder.

An exemplary embodiment of the invention improves the situation described with respect to the prior art.

An exemplary embodiment of the invention overcomes these disadvantages of the prior art.

More specifically, an exemplary embodiment of the invention proposes a solution that contributes to reduce the cost of signalling a prediction mode selected for a current block among a plurality of candidate modes, without impairing the quality of the prediction.

It goes without saying that the embodiments which have been described above have been given for purely indicative and non-limiting reasons, and that many modifications can easily be made by those skilled in the art without departing from the scope of the invention.

The invention claimed is:

1. A method comprising the following acts performed by a decoding device:
   receiving from a communication network a coded data stream representative of at least one image, said image being divided into blocks; and
   decoding the coded data stream, a set of at least two prediction modes being available for predicting a current block of the blocks of the image, wherein the decoding comprises the following steps:
   obtaining at least two categories of prediction modes from the initial set, similarly to a stream coder;
   eliminating at least one category based on at least one first predetermined elimination criterion;
   updating the categories not eliminated by deleting prediction modes which are common with said at least one eliminated category; and
   decoding, from the data stream, information identifying for the current block a prediction mode among the modes of the updated categories.

2. A method comprising the following acts performed by a coding device:
   coding an image in the form of a stream of coded data, said image being divided into blocks, a set of at least two prediction modes being available for predicting a current block of the blocks of the image, wherein the coding comprises the following steps:
   obtaining at least two categories of prediction modes from the set, similarly to a stream coder;
   eliminating at least one category in accordance with at least one first predetermined elimination criterion;
   updating the categories not eliminated by deleting prediction modes which are common with said at least one eliminated category;
   selecting a prediction mode in one of the updated categories; and
   coding information identifying the prediction mode selected from the updated category prediction modes, and inserting the coded information into the coded data stream; and
   transmitting the coded data stream over a communication network.

3. The method according to claim 1, wherein the obtaining step comprises reading identification information for said categories in a memory.

4. The method according to claim 1, wherein the obtaining step comprises analysing at least one feature of a content of blocks already processed and creating categories from at least one criterion of grouping of the modes of prediction and according to said at least one analysed feature.

5. The method according to claim 1, wherein the method comprises, for a category obtained, determining a prediction mode representing this category and wherein the step of eliminating the category comprises eliminating the representative prediction mode, wherein the elimination of the category is triggered by the elimination of the prediction mode representing the category.

6. The method according to claim 1, wherein, for a category obtained, the step of eliminating the category comprises eliminating successively its prediction modes and comparing the number of prediction modes eliminated in the category to a predetermined threshold, wherein eliminating the category is triggered when the number of eliminated modes is greater than the threshold.

7. The method according to claim 1, wherein the method comprises, for a category obtained, said category being associated with a criterion for grouping prediction modes, analysing the content of the neighbouring blocks already processed intended to provide a feature of the content and wherein the elimination step eliminates the category when the feature and the grouping criterion are incompatible with each other.

8. A decoding device comprising:
   a processor; and
   a non-transitory computer-readable medium comprising instructions stored thereon, which when executed by the processor configure the decoding device to perform acts comprising:
   receiving from a communication network a coded data stream representative of at least one image, said image being cut into blocks; and
   decoding the coded data stream, a set of at least two prediction modes being available for predicting a current block of the blocks of the image, wherein the decoding comprises:
   obtaining at least two categories of prediction modes from the set, similarly to a stream coder;
   eliminating at least one category in accordance with at least one first predetermined elimination criterion;
   updating the categories not eliminated by deleting prediction modes which are common with said at least one eliminated category; and
   decoding , from the data stream, information identifying for the current block a prediction mode among the modes of the updated categories.

9. A coding device comprising:
   a processor; and
   a non-transitory computer-readable medium comprising instructions stored thereon, which when executed by the processor configure the coding device to perform acts comprising:
   coding an image in the form of a coded data stream, said image being divided into blocks, a set of at least two prediction modes being available for predicting a current block of the blocks of the image, wherein the coding comprises:
   obtaining at least two categories of prediction modes from the set, similarly to a stream decoder;

eliminating at least one category in accordance with at least one first predetermined elimination criterion;

updating the categories not eliminated by deleting prediction modes which are common with said at least one eliminated category;

selecting a prediction mode in one of the updated categories; and coding information identifying the prediction mode selected from the updated category prediction modes, and inserting the coded information into the coded data stream; and transmitting the coded data stream over a communication network.

10. The decoding device of claim 8, wherein the decoding device is comprised in a terminal equipment.

11. A non-transitory computer-readable medium comprising a computer program stored thereon, which comprises instructions for implementing a decoding method, when executed by a processor of a decoding device, wherein the decoding method comprises:

receiving from a communication network a coded data stream representative of at least one image, said image being divided into blocks; and decoding the coded data stream, a set of at least two prediction modes being available for predicting a current block of the blocks of the image, wherein the decoding comprises the following steps:

obtaining at least two categories of prediction modes from the initial set, similarly to a stream coder;

eliminating at least one category based on at least one first predetermined elimination criterion;

updating the categories not eliminated by deleting prediction modes which are common with said at least one eliminated category; and decoding, from the data stream, information identifying for the current block a prediction mode among the modes of the updated categories.

12. A non-transitory computer-readable medium comprising a computer program stored thereon, which comprises instructions for implementing a coding method, when executed by a processor of a coding device, wherein the coding method comprises:

coding an image in the form of a stream of coded data, said image being divided into blocks, a set of at least two prediction modes being available for predicting a current block of the blocks of the image, wherein the coding comprises the following steps:

obtaining at least two categories of prediction modes from the set, similarly to a stream coder;

eliminating at least one category in accordance with at least one first predetermined elimination criterion;

updating the categories not eliminated by deleting prediction modes which are common with said at least one eliminated category;

selecting a prediction mode in one of the updated categories; and coding information identifying the prediction mode selected from the updated category prediction modes, and inserting the coded information into the coded data stream; and transmitting the coded data stream over a communication network.

13. The method according to claim 2, wherein the obtaining step comprises reading identification information for said categories in a memory.

14. The method according to claim 2, wherein the obtaining step comprises analysing at least one feature of a content of blocks already processed and creating categories from at least one criterion of grouping of the modes of prediction and according to said at least one analysed feature.

15. The method according to claim 2, wherein the method comprises, for a category obtained, determining a prediction mode representing this category and wherein the step of eliminating the category comprises eliminating the representative prediction mode, wherein the elimination of the category is triggered by the elimination of the prediction mode representing the category.

16. The method according to claim 2, wherein, for a category obtained, the step of eliminating the category comprises eliminating successively its prediction modes and comparing the number of prediction modes eliminated in the category to a predetermined threshold, wherein eliminating the category is triggered when the number of eliminated modes is greater than the threshold.

17. The method according to claim 2, wherein the method comprises, for a category obtained, said category being associated with a criterion for grouping prediction modes, analysing the content of the neighbouring blocks already processed intended to provide a feature of the content and wherein the elimination step eliminates the category when the feature and the grouping criterion are incompatible with each other.

18. The coding device of claim 9, wherein the coding device is comprised in a terminal equipment.

* * * * *